Sept. 15, 1964
W. A. JONES
3,148,548
VELOCITY MEASURING DEVICE
Filed March 20, 1959
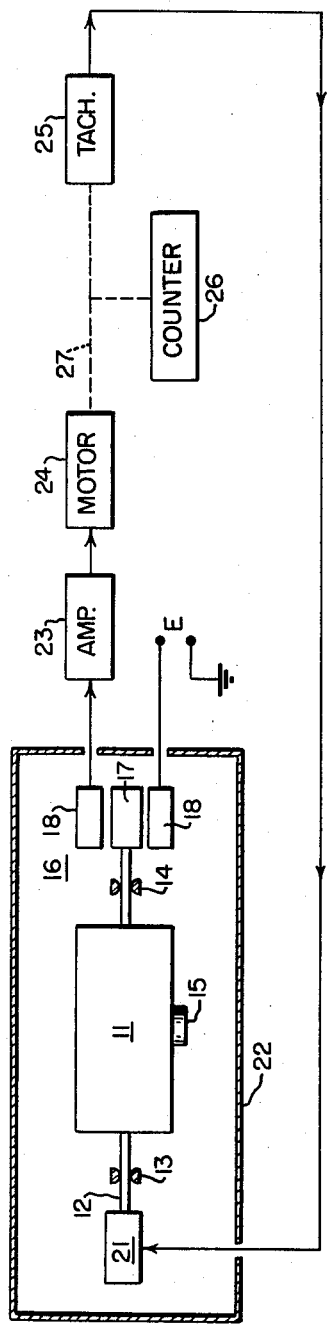
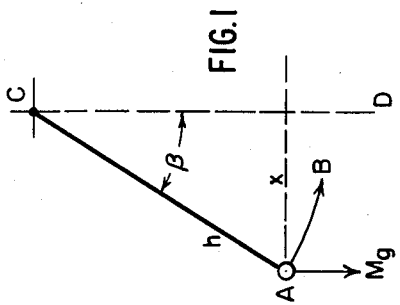
*INVENTOR.*
WILLIAM A. JONES
BY
KENWAY, JENNEY, WITTER & HILDRETH
ATTORNEYS United States Patent Office 3,148,548
Patented Sept. 15, 1964

3,148,548
VELOCITY MEASURING DEVICE
William A. Jones, Boston, Mass., assignor, by mesne assignments, to Northrop Corporation, Beverly Hills, Calif., a corporation of California
Filed Mar. 20, 1959, Ser. No. 800,859
1 Claim. (Cl. 73—503)

The present invention relates in general to new and improved apparatus for measuring linear velocity, in particular, apparatus utilizing an unbalanced mass which is responsive to a change of velocity along a sensitive axis.

Prior art devices of the type producing an indication of linear velocity from a measurement of acceleration or deceleration along a sensitive axis, generally employ means for converting the physical displacement due to the accelerating force into an electrical signal which, in turn, is operated upon to obtain a signal representative of the integral thereof. Various types of integrating circuits are in use today which are directly dependent on the quality of the components employed in order to approximate perfect integration. In high-precision navigational systems the use of such integrating circuits may produce serious errors resulting in an erroneous indication of acceleration, velocity, or position. Inasmuch as the information indicated at any given moment in such systems is normally dependent on the data previously measured, such errors tend to have a cumulative effect which seriously subjects to question the accuracy of any given measurement.

It is the object of this invention to overcome the foregoing disadvantages by providing acceleration-sensitive apparatus in a closed loop feedback system and further employing improved integration means in the feedback loop. Further objects and advantages of this invention will become apparent from the following detailed specification with reference to the drawings in which:

FIG. 1 illustrates the relationship of forces acting on a simple pendulum; and

FIG. 2 illustrates a preferred embodiment of the system which forms the subject matter of the invention herein.

With reference now to FIG. 1, a simple pendulum is illustrated which has a null position C–D, and which is sensitive to a change of velocity in the direction of line $x$. From a consideration of the torque produced by rotation of the pendulum about point C in the direction A→B, a relationship for the linear acceleration in the aforesaid direction may be derived as follows:

$$a = \frac{Mgh^2 \sin \beta}{I}$$

where $a$ = linear acceleration
$M$ = mass of pendulum
$g$ = acceleration due to gravity
$h$ = distance from point of suspension to center of gravity of pendulum
$\beta$ = displacement angle of pendulum
$I$ = moment of inertia of pendulum about a transverse axis at the point of suspension Where apparatus is provided responsive to the angular displacement of the pendulum to generate a signal, as explained in greater detail hereinbelow, the output voltage $E_o$ is determined by the following equation:

$$E_o = k\beta$$

where $k$ = sensitivity of the signal generator.

If $\beta$ is small, its value in radians may be considered equal to sin $\beta$.
Accordingly, $$E_o = \frac{aIk}{Mgh^2}$$

If a torquer motor is used to position the pendulum, the torque produced by a current $i$ required to return the gimbal to its null position, is $$T_t = -Ji$$

where $T_t$ = torque produced by the torquer motor.
$i$ = torquer motor current.
$J$ = torquer motor sensitivity.

The torque $T_c$ which is produced by the pendulum when travelling from A to B can be shown to be:

$$T_c = \frac{aI}{h}$$

It will be seen from a consideration of the two torque equations above, that the current $i$, required to torque the pendulum to its null position, is proportional to the change of linear velocity encountered by the pendulum. The output of a motor-driven current generator supplying the aforesaid current $i$, is proportional to the angular velocity of its driving motor. If the driving motor is energized by the aforesaid signal $E_o$ and bearing in mind that $T_t = T_c$, it can be shown that $$V = AP$$

where $V$ = linear velocity of the pendulum in the direction of line $x$.
$A$ = system constant
$P$ = total number of revolutions of motor output shaft.

Accordingly, the number of revolutions of the motor output shaft is a measure of the linear velocity of the pendulum in the direction of line $x$.

FIG. 2 illustrates a preferred embodiment of the invention. A gimbal 11 is carried by a shaft 12 supported in jewel bearings 13 and 14, and is adapted to rotate about the axis of the shaft. The construction of gimbal 11 is such as to present a non-uniform distribution of mass about its axis of rotation. The latter construction is illustrated schematically by weight 15 affixed to the circumference of the gimbal. It will be understood that such non-uniform mass distribution of the gimbal may be effected in numerous ways and may, if desired, be carried out in a graduated as well as in an adjustable manner. The total effect of the non-uniform distribution of mass about the gimbal axis of rotation causes the gimbal to act as a compound pendulum which, in the absence of other forces, seeks a null position determined by gravity. The gimbal is illustrated in its null position in the drawing. The rotor 17 of a differential transformer microsyn 16 is mechanically coupled to shaft 12, the windings of stator 18 being excited from a source E. A D.C. torquer motor 21 is mechanuically coupled to the other end of shaft 12 and is adapted to position the gimbal in response to the signal received at its input. The combination of the torquer motor, gimbal, and microsyn is preferably packaged in a container 22, the latter further holding a viscous fluid to provide the desired damping constant. The output of microsyn stator 18 is coupled to an A.C. amplifier 23, the latter, in turn, being connected to the input of an integrating motor 24. Output shaft 27 of motor 24 is mechanically coupled to a D.C. tachometer 25 as well as to a counter 26. The output of the D.C. tachometer is connected to the input of the torquer motor 21 to complete the feed back loop.

In operation, gimbal 11 acting as a compound pendulum due to weight 15, responds to a change of velocity along its sensitive axis normal to the plane of the drawing by an angular displacement about its axis of rotation from the illustrated null position. The microsyn which is adjusted to yield zero output signal when rotor 17 is in its null position, now produces an A.C. signal having an amplitude proportional to the angular displacement of the rotor and further dependent on the amplitude of the stator excitation signal E. The microsyn output signal is amplified in amplifier 23 whence it is applied to motor 24. While the angular rate of motor output shaft 27 is proportional to the amplitude of the signal received from amplifier 23, the motor also acts as a substantially perfect integrator of the angular shaft rate. In the latter case, the total angle through which shaft 27 turns in a given time period, as measured by counter 26, represents the integral of the applied input signal. In the present example, the angular displacement of gimbal 11 from its null position about the shaft axis and consequently the angular displacement of rotor 17, is proportional to the acceleration or change of gimbal velocity in the direction of the aforesaid sensitive axis. Accordingly, the A.C. signal at the stator output is proportional to acceleration of the gimbal along the sensitive axis. This signal is amplified and applied to motor 24 where it is transformed into an angular shaft rate proportional thereto. Inasmuch as the shaft rate is proportional to gimbal acceleration along the sensitive axis, the integral of the shaft rate, as indicated by counter 26, is proportional to the instantaneous linear velocity along the same axis. Tachometer 25, which is mechanically coupled to output shaft 27, provides a D.C. output signal propotrional to the shaft rate, i.e. proportional to gimbal displacement from the null position due to a change of velocity along the sensitive axis. The latter signal is applied to torquer motor 21 where it acts to torque the gimbal back to its null position. If desired, the output of counter 26 can be further integrated to obtain an indication of the total distance traveled by gimbal 11 along the sensitive axis during a predetermined time interval.

The provision of mechanical integration in the feedback loop of an acceleration-responsive velocity measuring system, as described above, results in improved operation coupled with increased accuracy of measurement. In actual experimnts, accuracies of the order of 0.01% were obtained which are far in excess of those obtainable with comparable prior art instruments. The unique construction of the present invention further lends itself to placing the output winding of the D.C. tachometer 25 in series with the input winding of torquer motor 21. Where these two coils are made of the same material, e.g. copper, an ideal match is obtained and the possibility of a temperature gradient between the coils which could result in a thermal E.M.F., is obviated.

The linearity of response of the feedback loop employed contributes materially to the improved operation of the invention herein. In this context, it is helpful to consider the tachometer whose output current may be likened to that of the standard cell. Virtually perfect linearity is obtainable as long as the current drawn from the tachometer remains small. To this end, and for the purpose of raising the loop gain to obtain a general improvement in sensitivity, both the load imposed on the torquer motor as well as the maximum displacement angle are kept small. One expedient of lightening the load on the torquer motor for the purpose of decreasing the current drawn by it, is to keep the total weight of gimbal 11 small. Alternatively, weight 15 may be moved close to the gimbal axis of rotation. Other techniques provide for using a tachometer which produces maximum output current for a given shaft rate. Additionally, the sensitivity of the torquer motor may be increased, or a D.C. amplifier may be used in order to increase the current supplied to the torquer motor.

It will be readily understood that many modifications are possible of the preferred embodiment of the invention which is illustrated in FIG. 2. Thus, many different pickoff devices could be substituted for microsyn 16. If desired, such a transducer could readily provide a D.C. output signal. In the latter case, of course, amplifier 23 and rotor 24 would both be responsive to a D.C. input. Similarly, tachometer 25 could consist of an A.C. generator provided torquer 21 is similarly responsive to A.C. Further possible variations have been discussed above in connection with gimbal 11.

It will be seen that the invention provides a measuring system wherein acceleration-sensitive apparatus is used in a linear, closed loop feed back system in order to provide an accurate measure of velocity in the direction of a sensitive axis.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claim.

I claim:

Apparatus for measuring linear velocity along a first axis comprising means rotatably disposed about a second axis and adapted to seek a predetermined null position about the latter axis, said means being adapted to be displaced from said null position in response to a change of velocity along said first axis, a signal generator for providing a first A.C. signal proportional to the angle of displacement from said null position, means for amplifying said A.C. signals, a first motor energized by the output of said amplifier and adapted to provide an angular shaft rate proportional to said first signal, a tachometer mechanically coupled to said first motor for providing a D.C. output signal across its output winding proportional to said shaft rate, a second motor having an input winding of the same material as, and connected in series with, said tachometer output winding, said second motor being adapted to return said first recited means to said null position in response to said tachometer output signal, and means for measuring the total shaft displacement angle of said first motor as an indication of the instantaneous linear velocity of said first recited means along said first axis.

References Cited in the file of this patent

UNITED STATES PATENTS

| | | |
|---|---|---|
| 1,840,001 | Tsujita | Jan. 5, 1932 |
| 2,690,531 | Marggraf et al. | Sept. 28, 1954 |
| 2,814,768 | Kinkel | Nov. 26, 1957 |
| 2,819,053 | Pope | Jan. 7, 1958 |
| 2,853,287 | Draper et al. | Sept. 23, 1958 |
| 2,878,435 | Rich et al. | Mar. 17, 1959 |
| 2,882,034 | Wuerth | Apr. 14, 1959 |
| 2,933,298 | Allison | Apr. 19, 1960 |

OTHER REFERENCES

An article entitled, "Directly Double-Integrating-Accelerometer" by K. E. Pope from "Aviation Age" magazine, January 1958, pages 50–55 (pages 51–53).